May 4, 1943.　　　M. B. TARK　　　2,318,436
SEDIMENTATION TANK
Filed Dec. 24, 1938　　　3 Sheets-Sheet 1

Inventor
Marcus B. Tark
by　Attorneys.

May 4, 1943.    M. B. TARK    2,318,436
SEDIMENTATION TANK
Filed Dec. 24, 1938    3 Sheets-Sheet 2
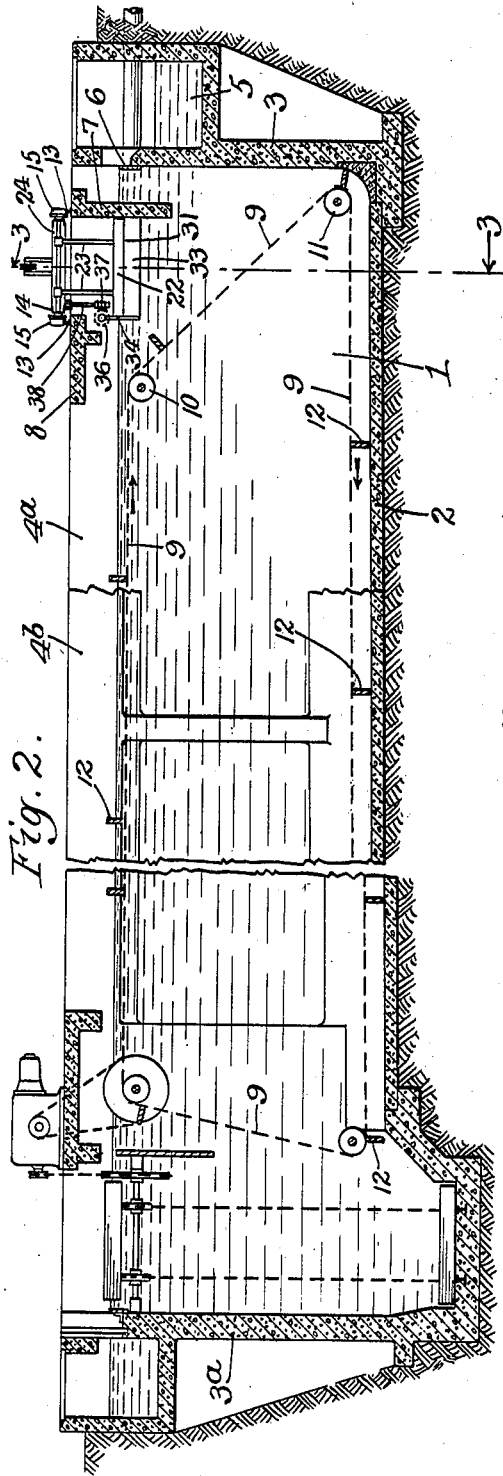
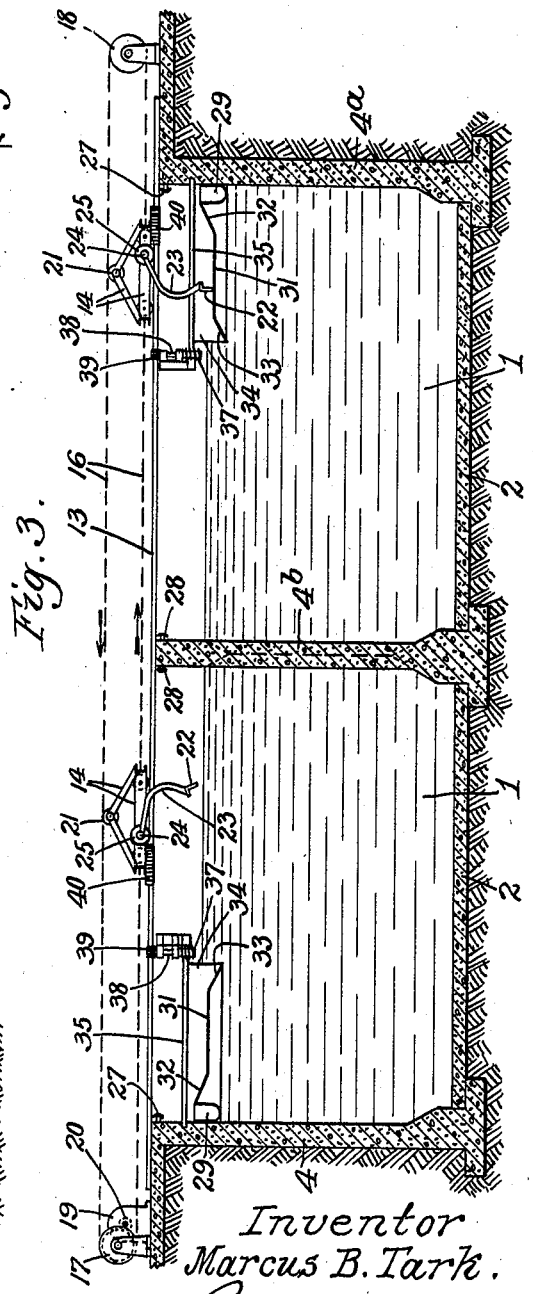
Inventor
Marcus B. Tark.
by Parker & Carter
Attorneys.

May 4, 1943.  M. B. TARK  2,318,436
SEDIMENTATION TANK
Filed Dec. 24, 1938  3 Sheets-Sheet 3

Inventor
Marcus B. Tark.
by Parker & Carter
Attorneys.

Patented May 4, 1943

2,318,436

UNITED STATES PATENT OFFICE 2,318,436

SEDIMENTATION TANK

Marcus B. Tark, Philadelphia, Pa., assignor to Link-Belt Company, Chicago, Ill., a corporation of Illinois Application December 24, 1938, Serial No. 247,675

9 Claims. (Cl. 210—55)

My invention relates to improvements in sedimentation tanks and has particular reference to scum collecting means therefor. One object of the invention is to provide scum collecting means which will insure proper collection of floating scum and its discharge from the tank with a minimum of wastage of the liquid.

Other objects will appear from time to time throughout the specification and claims.

My invention is illustrated more or less diagrammatically in the accompanying drawings, wherein—

Figure 2 is a section along the line 2—2 of Figure 1;

Figure 3 is a section along the line 3—3 of Figure 1;

Like parts are indicated by like characters throughout the specification and drawings.

Figure 1:
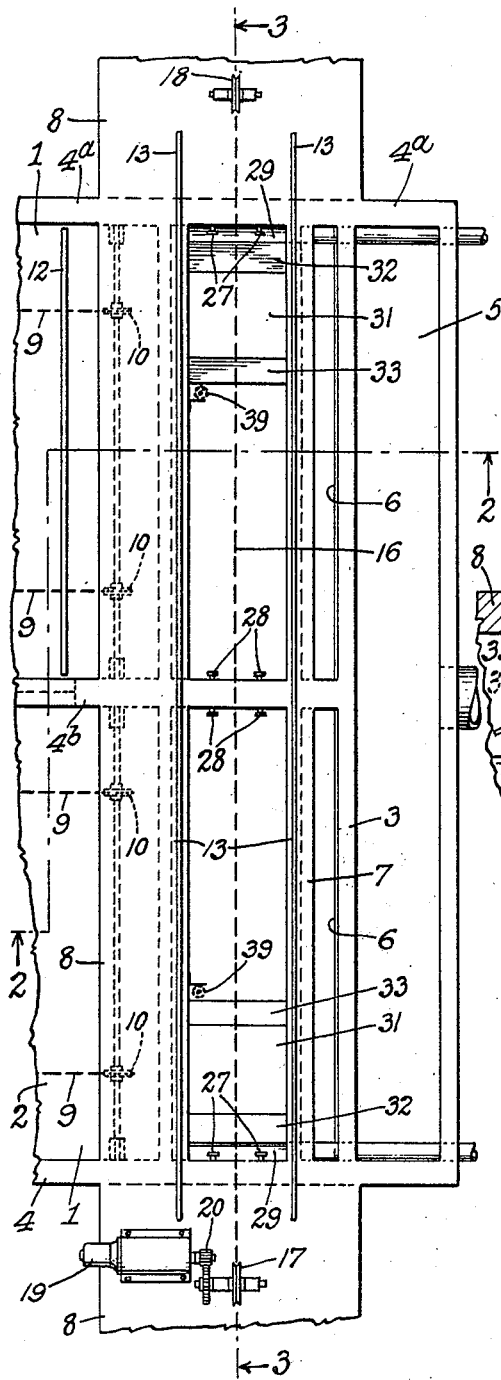
Figure 1 is a plan view of a part of a sedimentation tank with parts omitted.

1 is a rectangular sedimentation tank having a floor 2, an effluent end wall 3, an influent end wall 3a, side walls 4, and 4a. 5 is the effluent channel; 6, the effluent weir; 7, a scum baffle which takes the form of a wall parallel with the effluent wall 3, extending throughout the entire width of the tank and depending downwardly from above into the liquid so that floating scum is caught by the fixed scum or baffle wall 7, and liquid without scum may pass under it and over the weir to the effluent. 8 is a walkway extending across the tank, spaced in front of and parallel with the scum baffle wall 7. A sludge conveyor comprising endless chains 9, traveling over idler sprockets 10, and 11, and carrying conveyor flights 12, is operated by any suitable means in the direction of the arrow, the flights conveying settled sludge toward the influent wall 3a at the bottom and projecting upwardly from the body of the liquid to a point above the surface to convey floating scum in the direction of liquid flow toward the effluent wall 3.

The tank 1 is divided as indicated in Figure 3 into two or more parallel sections by walls 4b, in which case there will be one scum trough, scum hopper, scum scraper and carriage for each tank section, the reason for such division being that there is from an engineering and operating point of view a definite limit to the width of a tank which can be satisfactorily cleaned by a single scum and sludge conveyor. When the tanks exceed a certain width, it is better to divide them by permanent walls than it is to have a plurality of scum conveyors in the same tank.

13 indicates track rails carried one on the baffle wall 7, and one on the walkway 8. Mounted on these track rails is a carriage 14, having wheels 15, and adapted to be propelled by an endless cable 16 attached to the carriage 14 by any suitable means not here illustrated since such means are well known in the art and form no part of the invention here disclosed, which travels about a drive sheave 17, at one side of the tank, and an idler sheave 18, at the other side of the tank, the drive sheave 17, being driven by a motor 19, through gearing 20, which includes an automatic reversing means not specifically illustrated since it is well-known in the art and forms no part of the invention here disclosed. 21 is an idler pulley on the carriage adapted to support the upper portion of the cable.

22 is a skimming scraper blade supported by arms 23, rigid on a shaft 24, rotatable on the carriage 14. 25 is a brake drum on the shaft 24, associated with a friction brake 26, adapted to hold the shaft in whatever position it may be left. 27, 27 are cams on the side walls 4 and 4a of the tank and adapted to engage the arms 23, as the carriages move toward them in Figure 3 to rotate the skimming scraper into the feathering position above the level of the liquid. 28, 28 are cams on the intermediate side wall 4b, adapted to be engaged by the arms 23, at the opposite end of the scraper travel whereby as the carriage is reversing its direction of travel, the skimming scraper is forced downwardly to immerse it in the liquid.

29, 29 are scum hoppers on the tank walls 4, 4a, open at the top above the level of the liquid. They are bounded at one end by the baffle wall 7, and at the other end by end plates 301. 31 is a collecting plate located beneath the level of the liquid. 32 is a ramp extending upwardly from the collecting plate to the lip or edge of the hopper and 33 is a second ramp extending downwardly at the other end of the collecting plate. The collecting plate and ramps are bounded on one side by the scum baffle wall 7.

Figure 6:
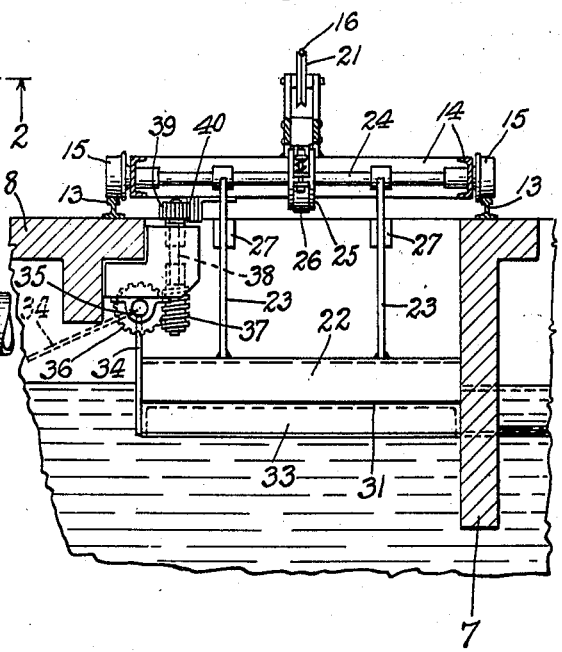
Figure 6 is a section along the line 6—6 of Figure 5.
Figure 4:
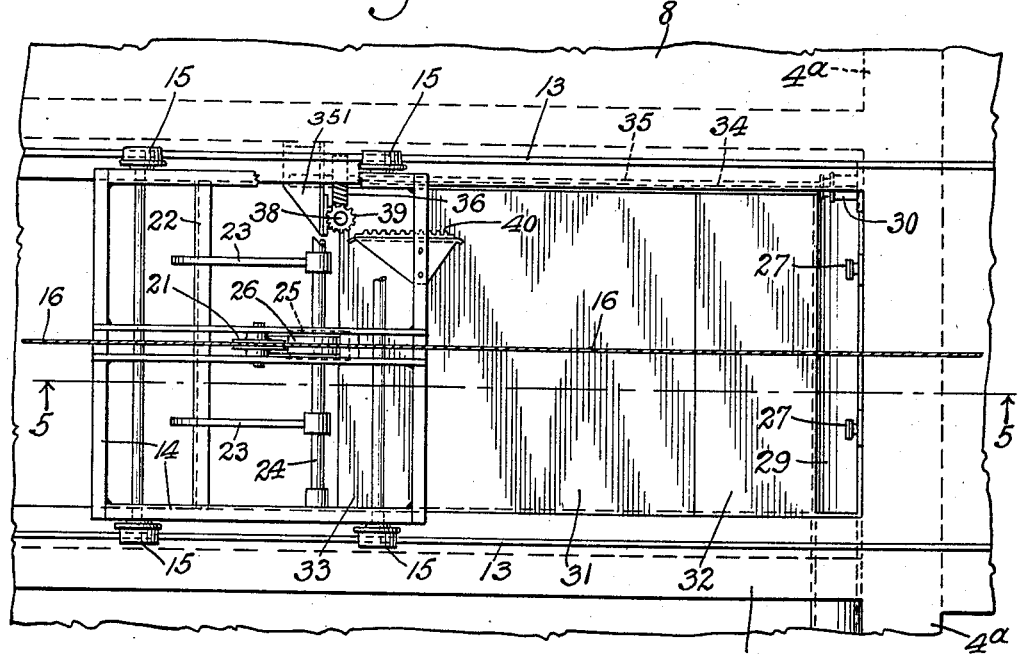
Figure 4 is a plan view of a portion of the sedimentation tank on an enlarged scale.

34 is a hinged plate mounted on a shaft 35, above the level of the liquid. The shaft 35 is supported at one end on the sleeve 30 on the wall 4 or 4a and at the other end on the bracket 351, the sleeves 30 being bolted to or cast in the wall, in any suitable manner not here specifically illustrated since it is well known in the art and forms no part of the present invention. The bracket 351 is attached to the walkway 8 by bolts 352. 36 is a worm gear on the shaft 35, and 37 is a worm on a vertical worm shaft 38, engaging the worm gear 36. 39 is a pinion on the upper end of the worm shaft 38; 40 is a rack on the carriage 14 adapted to mesh with and rotate the pinion, the arrangement being such that normally the hinged plate is in the raised or dotted line position as shown in Figure 6. Scum fed forwardly by the flights 12, will be propelled into the concentration zone along the entire end of the tank beneath the walkway 8, against the scum baffle 7. The hinged plate 34 being out of contact with the liquid offers no resistance to the movement of scum across the collecting plate. As the scum scraper 22 is moved across the tank toward the collecting plate, it propels the scum in the concentration zone toward the scum hopper. As the skimming scraper approaches the collecting plate, the rack 40 engages the pinion 39 and rotates the hinged plate 34 downwardly against the outer edges of the collecting plate 31 and ramps 32 and 33, to define a scum trough. The hinged plate remains in this position being held by the self-locking worm and gear while the skimming scraper travels into and along the trough.

Figure 5:
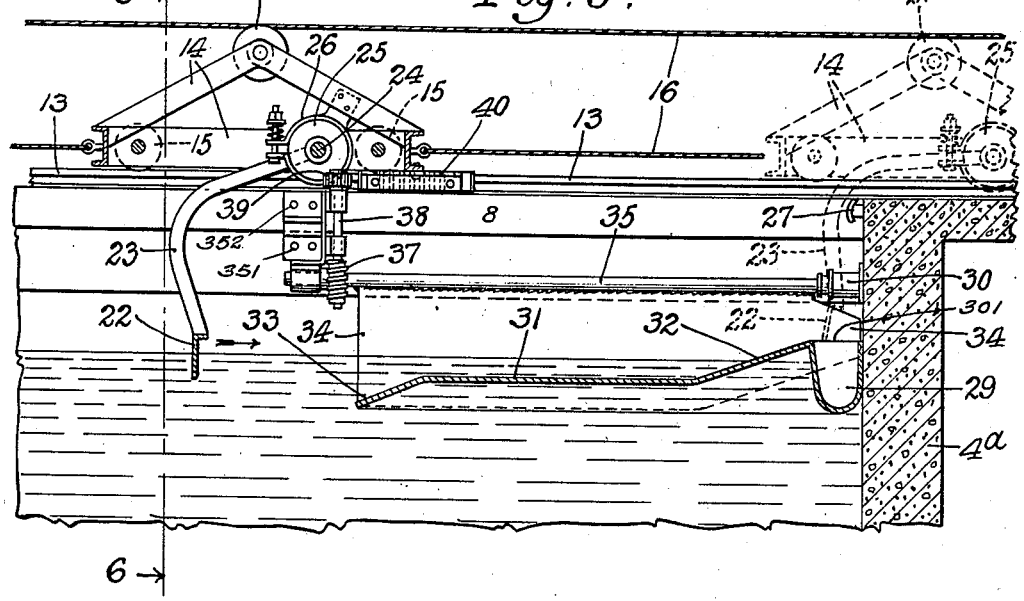
Figure 5 is a section along the line 5—5 of Figure 4.

The scraper blade engages first the ramp 33, as in Figures 3 and 5, is slightly raised thereby, then travels along the collecting plate 31, forcing liquid and scum ahead of it, then travels up the ramp 32, to discharge this liquid and scum into the scum hopper 29, the skimming scraper making a close fit between the fixed wall, the hinged plate and the collecting plate and ramps so that the contents of the scum trough may be forced into the scum hopper. To be sure, there will be some leakage of liquid between the scum scraper and the walls of the trough and between the hinged plate and the collecting plate and ramps but that leakage will be below the liquid level and will comprise liquid and little, if any, scum. The result is that the scum with some liquid will be forced into the scum hopper.

The ramps exert a camming action on the skimming scraper to lift the blade above the liquid level and the cams 27 complete this action so that on the return movement, the skimming scraper is above the liquid level in the trough. As the carriage 14 recedes from the trough, the pinion 40 engages the gear 39 and rotates the hinged plate into the open position where it remains until the next approach of the skimming scraper.

It will be understood that the specific mechanical device shown in the drawings and discussed in the specification is only exemplary of scum collecting means invented by applicant, that many changes in size, shape and arrangement of parts might be made without departing from the spirit of my invention. For instance, the particular arrangement of the scum trough and the side plate might be varied, as well as the means for controlling that plate. There might even be substituted for the automatic means including the rack 40, pinion 39, the shaft 38, the worm gear 36 and the worm 37, manually controlled means without in any way departing from the spirit of the invention.

The use of electric drive means and electric controls for the operation of the reciprocating carriage such as the carriage 14 is standard and well known in the art. Any suitable limit or reversing mechanism may be used and will be associated with the motor 19 as part of the electric control mechanism so that the motor will move first in one direction and then in another, the electric limit and reversing mechanism being so set that each carriage moves back and forth a full excursion across the tank. Since such electric control mechanisms are well known in the art and exceedingly complicated in design, it is believed that no illustration for them beyond the housing for the motor 19 which also contains such mechanism is desirable especially because such reversing mechanism forms no part of the present invention and a more specific disclosure would merely amount to a copying of the drawings of any one of a number of suppliers who habitually make and install such equipment. It will be understood that the operation of the scum skimmer, blades or flights 12 is altogether independent of the operation of the scraper 22. The flights 12 move scum toward the right in Figure 2 propelling it into the path of the scraper 22 throughout the entire width of the tank. The reciprocation of the scraper 22 being altogether controlled by the motor 19 and the electric control mechanism to cause such reciprocation of the scum scraper 22 independent of the operation of the chains 9 and conveyor flights 12.

The skimming scraper therefore as it approaches the trough making a close fit with the walls defining it, is of such width and such height as to completely close the trough and is guided by the track, carriage and supporting arms to cause it to rest on the bottom of the trough as it travels therealong.

The collecting plate 31, and the ramps 32 and 33 are shown as being integral with and part of the scum hopper 29 though obvious the particular way in which these parts are assembled, is not a part of the invention, that is to say,—they might equally well be separate plates riveted together or welded together. The point is that they form a continuous unit structure such that when the scraper 22 passes to the right in Figure 5, it first travels along the ramp 33, then along the collecting plate 31, then up the ramp 32 to discharge the material held between the wall 7 and the plate 34 into the scum hopper 29.

I claim:

1. In combination, a liquid containing tank, a scum hopper having a lip above the level of the liquid therein, a scum trough associated with the hopper having side walls and a floor beneath the level of the liquid, a ramp extending upwardly therefrom to the lip of the hopper, a skimming scraper extending into the liquid and means for moving it toward the hopper along the trough to force liquid and scum into the hopper, the skimming scraper being of such width and such height as to completely close the trough as it moves toward the scum hopper and means for guiding and positioning this scraper to rest on the bottom of the trough as it travels therealong.

2. In combination, a liquid containing tank, a scum hopper having a lip above the level of the liquid therein, a scum trough including a fixed wall, a movable side plate normally raised above the level of the liquid in the tank and in a plane out of parallelism with the fixed wall and a collecting plate, the latter beneath the level of the liquid, a ramp extending upwardly from the collecting plate to the lip of the hopper, a skimming scraper extending into the liquid, means for moving the skimming scraper toward the hopper along the collecting plate, and means for moving the side plate into position of general parallelism with the fixed wall and in engagement with the collecting plate as the skimmer approaches the hopper.

3. In combination, a liquid containing tank, a scum hopper having a lip above the level of the liquid therein, a scum trough including a fixed wall, a movable side plate normally raised above the level of the liquid in the tank and in a plane out of parallelism with the fixed wall and a collecting plate the latter beneath the level of the liquid, a ramp extending upwardly from the collecting plate to the lip of the hopper, a track, a carriage mounted for movement thereinalong in alignment with the trough, a scum scraper supported by the carriage and means for moving the carriage to propel the scraper toward and along the trough, a power transmission mechanism connected to the side plate and having a member adapted to be contacted by the carriage as the scraper approaches the trough for moving the side plate into and holding it in a position of general parellelism with the fixed wall and in engagement with the collecting plate.

4. In combination, a liquid containing tank, a scum hopper having a lip above the level of the liquid in the tank, a scum trough including a fixed wall, a movable side plate normally raised above the level of the liquid in the tank and in a plane out of parallelism with the fixed wall, a collecting plate beneath the level of the liquid extending outwardly from the fixed wall, a ramp extending upwardly from the collecting plate to the lip of the hopper, a skimming scraper extending into the liquid, means for moving it toward the hopper along the collecting plate, mechanism for rotating the side plate into and out of a position of general parallelism with the fixed wall and in engagement with the collecting plate, and a discontinuous driving connection between said mechanism and the scraper moving means and means for completing said driving connection to rotate the side plate into engagement with the collecting plate only as the skimming scraper approaches the trough, and means for completing said driving connection to rotate the side plate to its normal position above the level of the liquid as the skimming scraper recedes from the trough only, a scum collector in the tank located at one side of the path of and adapted to propel scum into the path of the skimming scraper.

5. In combination, a sedimentation tank, a scum hopper, a scum trough including a floor generally parallel with and below the level of the liquid, a ramp extending from the floor upwardly above the level of the liquid to the lip of the scum hopper, a second ramp depending downwardly from the trough floor, walls forming the opposed sides of the trough located above and below the level of the liquid, and scum scraping means adapted to make close contact with both walls and the floor and means for propelling such scraping means forwardly through the trough to discharge liquid and scum into the hopper.

6. In combination a liquid containing tank, a scum hopper, a trough having walls and a floor extending above and below, and discharging into the scum hopper above the liquid level, a scum scraper movable along and adapted to engage the floor and both sides of the trough to completely close it, means for propelling the scraper along the trough to the hopper to force liquid and scum trapped in the trough into the hopper, one wall of the trough being movable, means for normally holding said wall out of engagement with the surface of the liquid and for moving it into engagement with the surface of the liquid and the floor of the trough.

7. In combination, a liquid containing tank, a scum hopper, a trough having walls, and a floor extending above and below, and discharging into the scum hopper above the liquid level, a scum scraper movable along and adapted to engage the floor and both sides of the trough to completely close it, means for propelling the scraper along the trough to the hopper to force liquid and scum trapped in the trough into the hopper, one wall of the trough being movable, means for normally holding said wall out of engagement with the surface of the liquid and for moving it into engagement with the surface of the liquid and the floor of the trough, said means including an actuating member movable with the scraper, a driven member in the path of the actuating member and a driving connection between the movable wall and the driven member.

8. In combination, a liquid containing tank, a scum hopper, a trough having walls and a floor extending above and below, and discharging into the scum hopper above the liquid level, a scum scraper movable along and adapted to engage the floor and both sides of the trough to completely close it, means for propelling the scraper along the trough to the hopper to force liquid and scum trapped in the trough into the hopper, one wall of the trough being movable, means for normally holding said wall out of engagement with the surface of the liquid and for moving it into engagement with the surface of the liquid and the floor of the trough, said means including a rack movable with the scraper and pinions associated with the movable wall, a gear adapted to be engaged by the rack as it approaches with the scraper toward the trough and driving connection between the gear and the pinion.

9. In combination, a liquid containing tank, a scum hopper, a trough having walls and a floor extending above and below, and discharging into the scum hopper above the liquid level, a scum scraper movable along and adapted to engage the floor and both sides of the trough to completely close it, means for propelling the scraper along the trough to the hopper to force liquid and scum trapped in the trough into the hopper, one wall of the trough being movable, means for normally holding said wall out of engagement with the surface of the liquid and for moving it into engagement with the surface of the liquid and the floor of the trough, said means including a rack movable with the scraper and a pinion associated with the movable wall, a gear adapted to be engaged by the rack as it approaches with the scraper toward the trough and a driving connection between the gear and the pinion, a support for the movable wall upon which it is rotatably mounted about an axis above the level of the liquid, the pinion being connected to the wall so that rotation of the pinion results in rotation of the wall, the connection between the pinion and the gear including a worm in mesh with the pinion and a shaft carrying the worm and the gear.

MARCUS B. TARK.